H. J. HAIGH.
BAKING PAN.
APPLICATION FILED JULY 11, 1916.
1,262,481.
Patented Apr. 9, 1918.
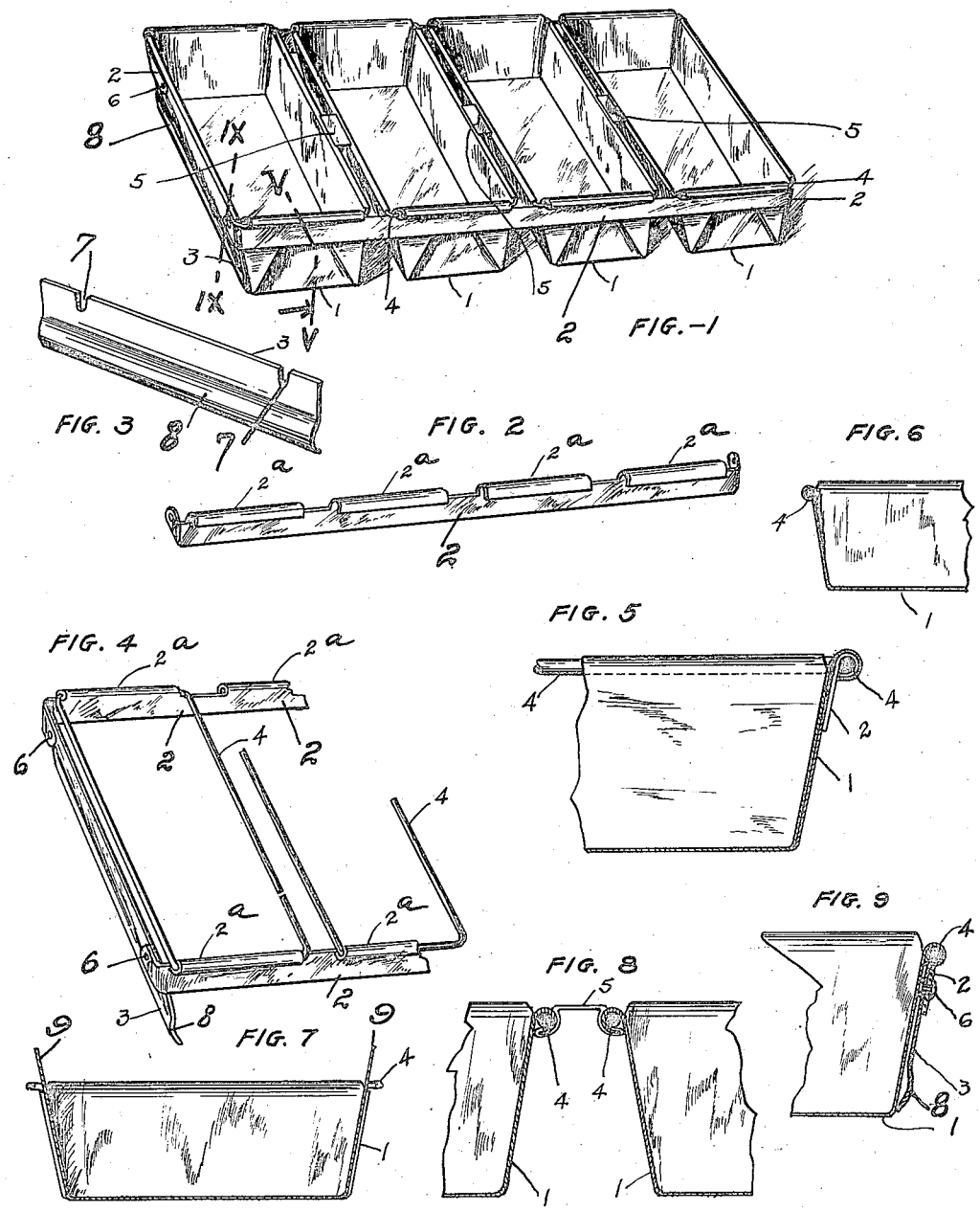
WITNESSES
Harry J. Haigh INVENTOR
ATTORNEYS

UNITED STATES PATENT OFFICE.

HARRY J. HAIGH, OF NEW YORK, N. Y.

BAKING-PAN.

1,262,481.　　　　　Specification of Letters Patent.　　Patented Apr. 9, 1918.

Application filed July 11, 1916. Serial No. 108,692.

*To all whom it may concern:*

Be it known that I, HARRY J. HAIGH, a citizen of the United States, and a resident of Stapleton, county of Richmond, city and State of New York, have invented certain new and useful Improvements in Baking-Pans, of which the following is a full, clear, and exact description.

This invention relates to that class of baking pans employed in bakeries where it is desired for convenience in handling, to rigidly connect together a plurality of pans.

One of the main objects of the invention is to provide improved means for strapping together a number of pans in such manner that no rivets or other fastening means will be exposed at the inner surface of the pans.

Another object of the invention is to provide rigid straps for connecting the pans in series, the metal of the pans being interlocked with the straps in such manner as to rigidly connect the pans and straps without the use of rivets or other similar fastening devices.

There are other important objects and advantages of the invention, which will more fully hereinafter appear.

With these and other objects in view, the invention will be hereinafter more particularly described with reference to the accompanying drawings, which form a part of this application, and will then be pointed out in the claims at the end of the description.

In the drawings, Figure 1 is a perspective view of a series of pans connected together in accordance with my invention.

Fig. 2 is a similar view of one of the connecting straps.

Fig. 3 is a perspective view of one of the buffer plates.

Fig. 4 is a detail perspective view of a portion of the end straps, showing the pan reinforcing wires connected thereto.

Fig. 5 is a detail vertical sectional view taken on the line V—V of Fig. 1.

Fig. 6 is a detail vertical sectional view of the side of one pan.

Fig. 7 is a detail vertical sectional view of one pan detached from the connecting straps.

Fig. 8 is a detail sectional view, showing the device for separating the pans and bracing the sides thereof; and Fig. 9 is a detail sectional view taken on the line IX—IX of Fig. 1, showing the manner of connecting the buffer plate to the connecting straps.

Referring to the various parts by numerals, 1 designates the pans. These pans are each formed of sheet metal suitably cut and folded to form a pan of the required dimensions. Around the upper edge of each pan is secured a reinforcing wire frame 4. As shown in Fig. 1, the longitudinal edges of the pans are turned over the corresponding portions of the reinforcing wire frame. The end bars of the reinforcing wire frames extend slightly beyond the ends of the pans, as shown clearly in Fig. 7, and until the pans are assembled and secured to the connecting straps, the end walls 9 of the pans extend slightly above the reinforcing frames, as shown in Fig. 7.

Connecting straps 2 are arranged along the ends of the pans, the said pans being arranged with their longitudinal edges parallel, as shown clearly in Fig. 1. Along the upper edge of each strap is formed a series of upwardly extending lugs $2^a$. In assembling the pans these lugs $2^a$ extend upwardly between the end walls of the pans, and the end bars of the reinforcing wire frames. The said lugs are then bent outwardly and downwardly to embrace said end wires and to rigidly secure the pans to the straps. The end walls of the pans are then bent outwardly and downwardly to embrace the bent over lugs $2^a$ to complete the connection between the pans and the connecting straps, and to lock the straps and pans together against vertical separating movement. The ends of the straps are bent around the end pans of the series, and said bent ends are riveted, as at 6, or otherwise rigidly connected to buffer plates 3. The upper edges of these plates are notched as at 7, to enable them to be readily placed between the bent ends of the straps and the adjoining side of the end pans, the rivets in the end straps fitting in said slots and rigidly clamping the buffer plates near their upper edges. The lower edges of the buffer plates are free, and are curved outwardly as at 8, to form a spring or cushion adapted to receive the thrust of the peeler or lifting paddle by means of which the operator lifts and manipulates the pans.

It is manifest from the foregoing that the connecting straps are rigidly interlocked with the metal of the pans, and that no rivets or other similar fastening or connecting devices are employed in securing the straps to the pans. It is also obvious that the metal of the pans might be interlocked with the metal of the straps in various ways, and, of course, I am not to be limited in this respect.

To brace the sides of the pans I provide a separator 5, which engages the beaded upper edges of the pans and prevents them from being forced close together by the weight of the dough.

Having thus described my invention, I claim as new and desire to secure by Letters Patent:—

1. A series of pans arranged side by side, a reinforcing wire frame around the upper edge of each of said pans, connecting straps arranged along the ends of the pans and formed with upwardly extending outwardly bent lugs embracing the end wires of the reinforcing wire frames and engaging the inner edges of the side members of the frames, the upper edges of the end walls of the pans being turned outwardly and downwardly to embrace the lugs on the connecting straps.

2. A series of pans arranged side by side, a reinforcing wire frame around the upper edge of each of said pans, connecting straps arranged along the ends of the pans and formed with upwardly extending outwardly bent lugs embracing the end wires of the reinforcing wire frames substantially throughout the length of said wires, the upper edges of the end walls of the pans being turned outwardly and downwardly to embrace the lugs on the connecting straps, buffer plates covering the outer side walls of the end pans, and means connecting the upper edge of said buffer plates to the ends of the connecting straps.

3. A multiple baking pan comprising a plurality of pans arranged side by side, a reinforcing wire frame around the upper edge of each pan, the upper edges of the side walls of said pans being bent outwardly around the side members of said frames, and connecting bars extending along the end walls of said pans and formed with lugs opposite the ends of the pans, said lugs being bent outwardly and downwardly around the end members of the reinforcing frames and adapted to prevent movement of the pans longitudinally of the connecting bars.

This specification signed this 8th day of July A. D. 1916.

HARRY J. HAIGH.